INVENTOR.
LEON P. GAUCHER
BY
ATTORNEYS

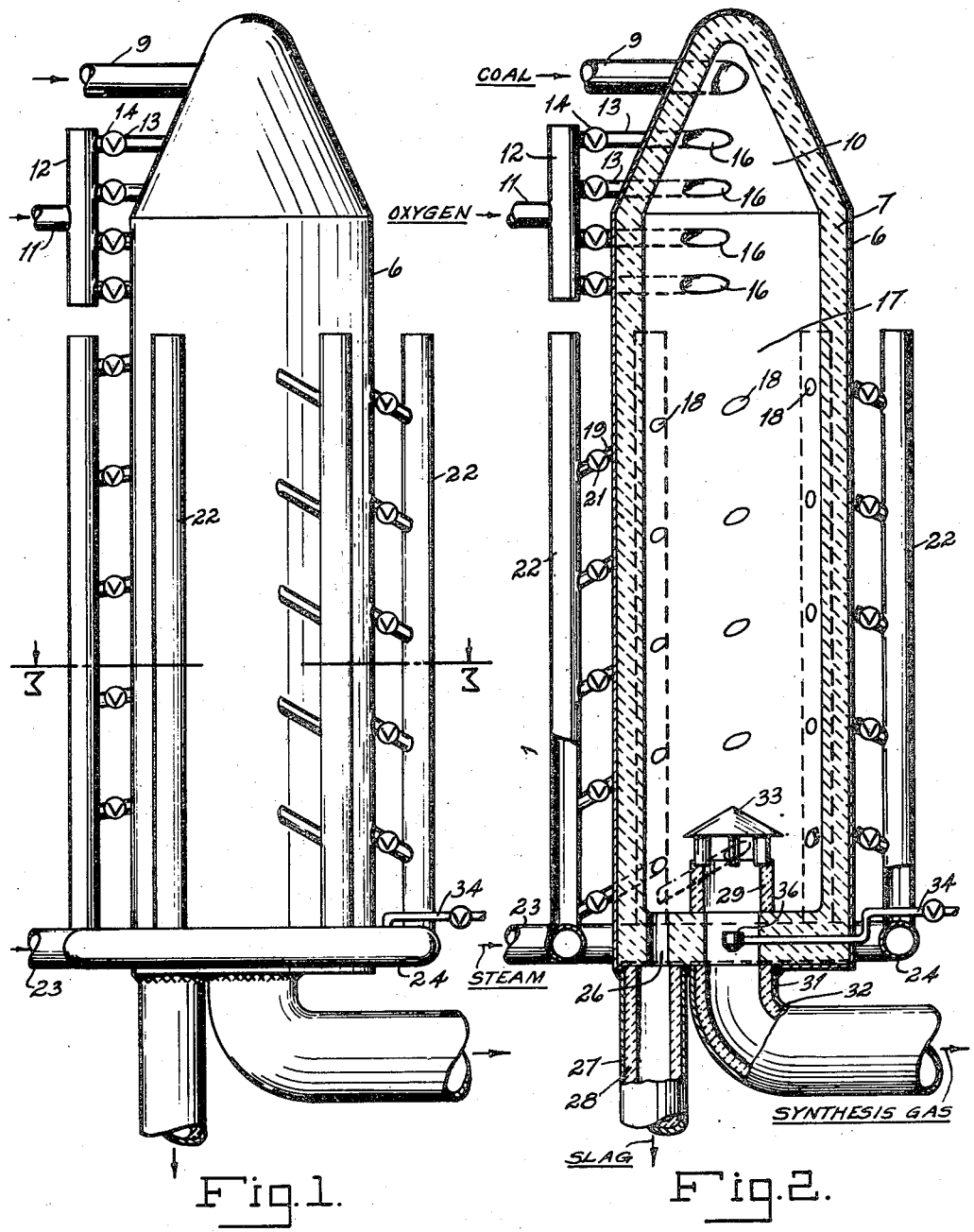

UNITED STATES PATENT OFFICE 2,558,746

PRODUCTION OF CARBON MONOXIDE AND OTHER GASES FROM CARBONACEOUS MATERIALS

Leon P. Gaucher, Mount Vernon, N. Y., assignor to The Texas Company, New York, N. Y., a corporation of Delaware Application February 10, 1948, Serial No. 7,446

5 Claims. (Cl. 48—206)

This invention relates to a process and apparatus for the generation of gases comprising carbon monoxide from carbonaceous materials. In one of its more specific aspects it relates to a process and apparatus for the generation of a mixture of carbon monoxide and hydrogen, suitable as a feed for the synthesis of hydrocarbons, from powdered coal.

The synthesis of hydrocarbons by the interaction of carbon monoxide and hydrogen is well known. A number of processes are known to be effective for hydrocarbon synthesis. In general liquid hydrocarbons are most effectively produced by the interaction of carbon monoxide and hydrogen at an elevated temperature and pressure in the presence of a suitable catalyst, usually an element of the iron group of the periodic table of the elements.

The present invention is concerned with the generation of a mixture of carbon monoxide and hydrogen. The invention is particularly suited to the production of a feed gas for the synthesis of hydrocarbons. Liquid or solid carbonaceous fuels may be used, e. g. a hydrocarbon fuel oil, coal, etc.; the method and apparatus is especially useful when powdered coal is used as the feed material.

An object of this invention is to provide a process for the generation of carbon monoxide and hydrogen from carbonaceous materials.

Another object is to provide a process particularly suited to the generation of a feed gas for the synthesis of hydrocarbons from coal.

Still another object is to provide an improved method for size reduction of coal and the like.

A further object of this invention is to provide apparatus for the generation of carbon monoxide and hydrogen from carbonaceous materials.

Gasification of powdered coal by partial combustion in cylindrical generators has been proposed heretofore. To the best of my knowledge, however, these have not been commercially successful. Horizontal reactors of this sort were tried in Germany but were not developed beyond the experimental stage. Many problems remained unsolved when the work was abandoned. Difficulties particularly were experienced in obtaining substantially complete reaction of carbon and in preventing undesirable slag accumulation due to fusion of the ash. The method and apparatus of my invention improves the rate of carbon reaction, resulting in substantially complete carbon cleanup. Handling of slag is accomplished without particular difficulty due to the improved apparatus and improved method of injecting reactants and diluents into the reactor.

In the gasification of carbonaceous material with oxygen, particularly solid fuels, the reaction between the oxygen and fuel results in the production of carbon dioxide according to the equation:

$$C + O_2 = CO_2$$

The oxidation reaction, being highly exothermic, releases large quantities of heat.

The carbon dioxide, so produced, in contact with hot carbon, in turn, reacts with the carbon to produce carbon monoxide:

$$CO_2 + C = 2CO$$

Steam also reacts with heated carbon to produce carbon monoxide and hydrogen:

$$H_2O + C = CO + H_2$$

These reactions are endothermic and require heat from another source. The equilibrium is, of course, dependent upon the temperature. Heat for the endothermic or reduction reactions may be supplied from the oxidation reaction. Thus, in a gas generator there should be a free transfer of heat between the zone in which carbon dioxide is formed and the zone in which carbon dioxide is reduced by reaction with carbon.

The water gas shift reaction:

$$CO + H_2O = CO_2 + H_2$$

may also take place in the generator. The water gas shift reaction has little influence on the thermal balance in the generator. At about 1500° F., the equilibrium constant for the water gas shift reaction is unity. At higher temperatures the reaction tends to favor production of carbon monoxide and water, consuming hydrogen and carbon dioxide. This is undesirable since hydrogen, which is desirable in the product gas, is consumed. The reactions between carbon and carbon dioxide or water are much slower than the reaction of carbon with free oxygen. The reactions of carbon with carbon dioxide under generator conditions are over twice as fast as those with water.

There are, therefore, several conditions to be met in the generator. The heat released by the exothermic reactions may be utilized to supply the heat for the endothermic reactions. Heat transfer from the exothermic zone to the endothermic zone of the generator should be very rapid and unobstructed.

For efficient utilization of carbon, the particle size of solid fuels must be very small, particularly in the reduction zone. Intimacy of contact of gases and particles in the reduction zone is important to insure reaction in the limited contact time.

The temperature in the exothermic zone of the reactor should be as high as materials of construction will permit; preferably the temperature is, for example, on the order of 2800–3400° F. The temperature of the carbonaceous particles, through and through, must approach the overall temperature of the reactor. It is important that incompletely reacted solid particles be kept from contact with the cooler walls of the reactor or from the molten slag in which it may be trapped.

The second phase reactions are increased if the concentration of carbon dioxide produced in the exothermic zone is high. Therefore, the size of the reactor may be reduced or the degree of conversion obtainable in given reactor may be increased if the purity of free oxygen added is great enough to generate a high concentration of carbon dioxide.

It seems likely that the ratio of free oxygen to carbon in the feed to the generator must be greater with a solid fuel than with a gaseous or liquid fuel. Thus, if it is possible to burn natural gas completely with a ratio of free oxygen to carbon of 0.52, the ratio must be 0.60 or higher to burn coal completely under flow conditions. Why this should be so is not certain. It may be, however, that because the reactions do take place in two stages and because the reaction of unburned carbon in coal or solid fuel with carbon dioxide is more rapid than the reaction of the carbon with water, it is necessary for subsequent efficient performance to attain a high concentration of carbon dioxide in the exothermic zone. The only way in which this can be done in the generator is by the use of concentrated free oxygen for the exothermic reaction.

The present invention will be described, for the sake of simplicity, with reference to coal as a fuel. It will be understood that coal is used as a specific example and that the apparatus and method described is not necessarily limited to the use of coal. In accordance with this invention coal is ground or otherwise pulverized to as small a size as given equipment will economically permit. It is then surface dried so that there is no tendency for the powder to agglomerate, but moisture remains in the pore space within the coal particle itself. The powdered coal may be surface dried by passing it rapidly over a heated surface so that the exterior surface of the particle is heated to the drying temperature but the interior does not reach a temperature sufficient to drive moisture from the pore spaces. Another method of surface drying the powdered coal is by suspension of the powder in a stream of heated inert gas, for example, flue gas at a temperature sufficiently elevated to rapidly remove surface moisture. After a short contact time the coal particles are separated from the heated gas, for example, as by means of a cyclone separator, and fed to the generator before any appreciable quantity of moisture is evaporated from the pore space.

The powdered coal is fed into the generator into intimate contact with concentrated free oxygen; preferably the oxygen content of the oxygen-containing gas is 90% by volume or greater. Oxygen produced by most of the commercial oxygen processes is suited as the oxygen-containing gas fed to the generator. When contacted with concentrated oxygen, preferably preheated, the dry exterior surface of the coal particle reacts violently with oxygen, rapidly releasing heat which in turn heats the interior of the particle so rapidly that the particle is disintegrated or exploded because of the expansion of steam generated in the pores. This further reduces the size of the particles. The resulting powdered coal then reacts with additional oxygen to heat the particle individually through and through to the reaction temperature.

The gasification may be carried out at atmospheric or superatmospheric pressure; in the process of my invention the gasification is preferably carried out at elevated pressure. A pressure in excess of 100 pounds per square inch gauge in the generator is preferred.

A number of advantages may be expected from operation at superatmospheric pressure. The product gases so obtained are at a pressure suitable for further use saving compression costs in handling the product, the volume of which is in excess of the volume of the charge gases. The use of elevated pressure results in higher absolute oxygen partial pressure in the generator in contrast to low pressure operations and thus reaction rates are increased. Other advantages of pressure gasification are reduction of the size of the required equipment and improved heat transfer over shorter distances.

Efficient heat transfer from the exothermic to the endothermic reactions is very important to efficient operation. A portion of the heat transfer is by direct radiation; the balance, by convection. Transfer of heat from the exothermic to the endothermic zones by both radiation and convection is very efficient in the method and apparatus of this invention.

The heated powdered coal and resulting gases produced by oxidation, comprising carbon dioxide, pass directly to an endothermic zone. Steam is supplied to the endothermic zone in a preheated condition, for example at 1000–1500° F. The steam so introduced results in improved reaction of the carbon dioxide with carbon. It is believed that steam also promotes or catalyzes the reaction:

$$2CO + O_2 = 2CO_2$$

This results in rapid replacement of $CO_2$ reacted with carbon so long as free oxygen is available. Such a promoter is highly desirable because of the low oxygen concentration in the endothermic zone.

The steam and oxygen streams are preferably injected into the generator in such a manner that the particles of powdered coal assume a long rotary path through the reaction zone with a low incidence of collision with the walls of the reactor.

The apparatus described herein and forming a part of my invention provides for carrying out the reaction in a most efficient manner as will be more fully brought out in the following detailed description.

Fig. 1 is an elevational view of a preferred embodiment of apparatus suitable for carrying out the process of my invention.

Fig. 2 is a vertical cross-sectional view of the apparatus illustrated in Fig. 1.

Figure 3:
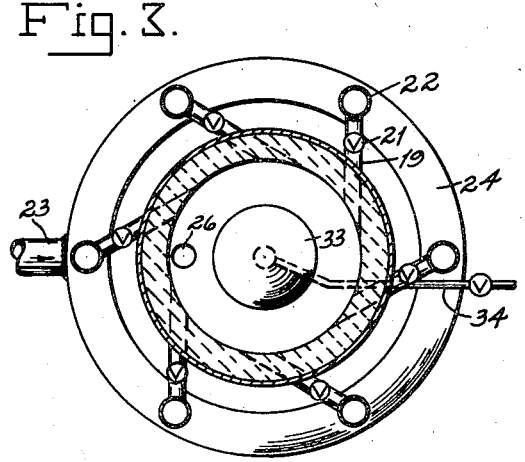
Fig. 3 is a horizontal cross-sectional view taken along the plane 3—3 of Fig. 1.

These generators illustrated in the drawings are particularly suited for the gasification of powdered coal and other carbonaceous materials containing volatile matter. For the purpose of facilitating the detailed description of the apparatus illustrated, the description will be made throughout with reference to powdered coal as the solid carbonaceous material. To distinguish the generator of Figs. 1 to 3 from the generator of Figs. 4 and 5, the former will be referred to as a downflow generator and the latter as up upflow generator.

With reference to Figs. 1 to 3, the generator is provided with an outer cylindrical steel shell 6 capable of withstanding operating pressure and a refractory lining 7 of a material suited to the temperature conditions encountered in operation. Powdered coal is introduced into the generator through a pipe 9 which enters the upper end of the generator, or the exothermic zone, adjacent the inner wall and tangential thereto. Preferably, the upper end of the generator or the primary oxidizing zone 10 is frustroconical in cross section as is illustrated in the figures. Oxygen is supplied to the zone through an oxygen line 11 and oxygen header 12. From the oxygen header a series of feed pipes 13 introduce the oxygen as controlled by valves 14 into the exothermic zone immediately below the point of introduction of the coal and tangential to the inner surface of the generator. The oxygen feed pipes 13 terminate in a series of ports 16 at the inner wall of the oxidation zone.

Steam is introduced into the generator in accordance with the process of this invention immediately below the exothermic zone. The steam enters the reactor through a series of ports 18 which are so spaced and arranged along the wall of the generator that the particles of coal are directed upwardly and away from the walls. The arrangement of ports will be discussed in greater detail hereinafter. The steam is supplied to the ports 18 through a series of feeder pipes 19 in amounts controlled by valves 21. The feeder pipes 19, in turn, are supplied from headers 22 with steam which enters the system through the steam line 23 and is fed into the headers by the distributing ring 24.

Molten ash and slag formed by burning of the coal is collected at the lower end of the generator from which it flows through the slag tap 26 into an insulated slag disposal pipe 27 provided with a refractory lining 28.

The generated gases comprising carbon monoxide and hydrogen are withdrawn through a chimney 29 at the lower end of the generator into the product gas line 31 which is lined with a suitable refractory 32. A shield 33 over the open end of chimney 29 prevents slag and ash particles from dropping into the chimney.

The synthesis gas is quenched by a water spray. Water is supplied through line 34 to a spray head 36 disposed within the outlet passage from chimney 29. By this means the hot synthesis gas may be cooled to a temperature below that at which undesirable reactions take place and below the melting point of the ash. Any entrained particles of molten ash or slag are converted to small solid particles in the form of a fly ash which can be readily removed from the synthesis gas by means of a mechanical separator, for example, a cyclone type separator.

Figure 5:
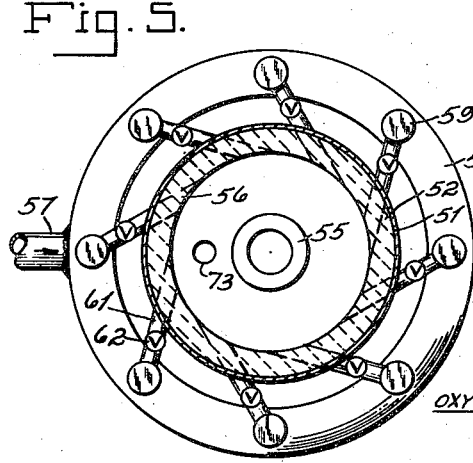
Fig. 5 is a horizontal cross-sectional view taken along the plane 5—5 of Fig. 4.
Figure 4:
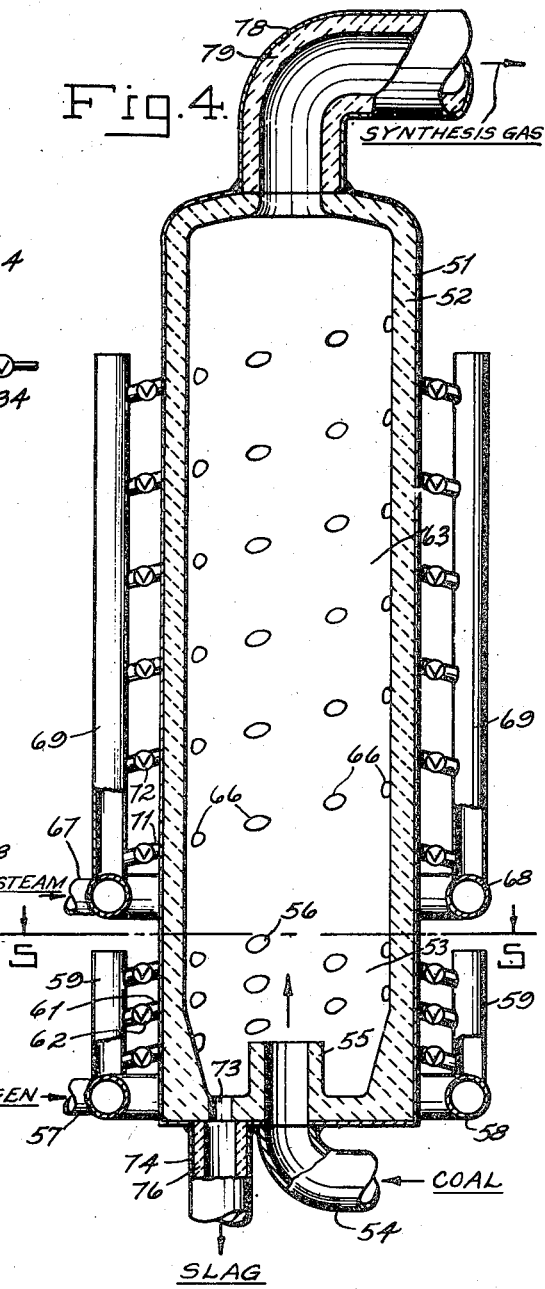
Fig. 4 is a vertical cross-sectional view of another embodiment of apparatus suitable for carrying out the process and forming a part of the present invention.

In the upflow generator illustrated in Figs. 4 and 5, the generator comprises a cylindrical steel vessel 51 capable of withstanding the operating pressure lined with a suitable refractory material 52. The coal is fed into the exothermic zone 53 of the generator through pipe 54 and nozzle 55. Oxygen enters the exothermic zone through a series of ports 56 which are so spaced and directed relative to the interior of the generator that the particles of coal are given a spiral upward motion away from the walls of the generator. The arrangement of the ports is discussed in more detail hereinafter. Oxygen is supplied to the generator through the oxygen line 57. The oxygen is fed into a distributor ring 58 from which a number of oxygen headers 59 carry it to the individual feeder pipes 61 which supply the ports 54. The flow may be controlled in the individual feeder pipes by the control valves 62.

Immediately above the exothermic zone 53 is an elongated endothermic zone 63 wherein unburned particles of carbon leaving the exothermic zone are reacted with carbon dioxide for the production of carbon monoxide. Steam is introduced in accordance with the process of my invention into the endothermic zone through a series of ports 66. The steam is supplied to the system through a steam line 67, distributor ring 68, and steam headers 69. Steam from headers 69 may be admitted to the endothermic zone of the generator through feeder pipes 71 which supply the ports 66 in desired amounts as controlled by valves 72. The ports 66 and supply lines 71 are so spaced and directed relative to the endothermic zone of the generator as to impart an upward motion to the particles of carbon. The particles are suspended by the upflowing gas stream from the exothermic zone augmented by steam introduced through ports 66. The arrangement of the ports 66 and supply pipes 71 will be discussed in more detail hereinafter.

The ash and slag is melted at the temperatures prevailing in the generator and tend to agglomerate and drop out of suspension or run down the walls. Molten ash and slag accumulating in generator are withdrawn through a slag tap 73 at the lower end of the generator from whence it is conducted away for disposal through a slag line 74 lined with a suitable refractory material 76.

The generated gases are withdrawn from the top of the generator by the product gas line 78 which is provided with a suitable refractory lining 79. Synthesis gas removed through pipe 78 may be quenched in any conventional manner. Quenching is beneficial to reduce the temperature below the temperature at which undesirable reactions take place at an appreciable rate and below the melting point of the ash. Ash which is cooled below the melting point in the form of fly ash gives little difficulty in handling with the gas stream and may be separated from the gas by any suitable means, for example, by means of a cyclone type separator.

In the operation of the generators, oxygen is fed at operating pressure into the generator in the exothermic section in amounts such that high yields of carbon dioxide are produced. The contact time in the oxidation zone is insufficient to completely consume the carbon so that carbon is available for reaction with carbon dioxide in the endothermic zone.

Steam introduced into the endothermic zone retards consumption of carbon dioxide by the reverse water gas shift reaction so that the carbon dioxide is available for reaction with carbon to produce carbon monoxide, as explained hereinabove. The steam is preheated to the desired temperature as is known in the art. Steam may be heated to temperatures as high as 3000° F. and possibly to 4000° F., for example, by passing the steam into contact with hot solids. The so-called "pebble heater" is suitable for preheating the steam to such temperatures.

In the interests of clarity and simplicity of illustration, such details as insulation of the steam supply lines, support members, and auxiliary equipment not necessary to the description of the generator have been omitted. The slag disposal vessel has not been illustrated. The slag is conveniently disposed of by discharging it into water in a separate vessel maintained at the same pressure as the generator. Other forms of apparatus may be used for carrying out the process of this invention.

The ports 18 in Figs. 1 to 3 and ports 56 and 66 of Figs. 4 and 5 of the apparatus illustrated in the drawings are arranged in a novel manner. All of these ports are utilized for the introduction of gases into the reaction zone. The ports are arranged and directed to spiral the gases upwardly through the reaction zones and at the same time direct the unreacted particles of coal away from the walls of the generators. This is accomplished by directing the gas stream upwardly from the horizontal and inwardly from the tangent with the inner wall of the generator. Preferably, the port discharges the gas upwardly at an angle of from about 5° to about 30° from the horizontal and inwardly at an angle of from 5° to about 30° from the tangent. The ports are arranged so that the gases do not impinge directly against the wall of the vessel but are directed into the gas stream from an adjacent port. Thus, particles of coal entrained in the gas stream are directed from one stream to another and spiraled upwardly away from the walls of the reactor. In the downflow generator of Figs. 1 to 3, the action of the steam admitted through the ports serves to hinder or delay the settling of the particles, particularly along the walls and to keep the particles from contact with the walls. In the upflow generator, the action of the oxygen and steam entering the ports and the velocity of the gas in the generator serves to entrain the particles carrying them upwardly through the reaction zones.

Typical results of operations in accordance with the process of my invention are given in the following examples. It will be evident that the examples are merely illustrative of the invention and no undue limitation is imposed thereby.

Example I

Coal having the following proximate analysis is used as feed for gas generation by the method of this invention.

| | Wt. per cent |
|---|---|
| Moisture | 4.3 |
| Volatile matter | 39.7 |
| Fixed carbon | 46.7 |
| Ash | 9.3 |

The generator is operated at a temperature of 2000° F. Sufficient oxygen is supplied to give a ratio of free oxygen to carbon of 0.7. While feeding 1700 pounds of coal, 630 pounds of steam is fed to the reduction zone of the generator. The product gas is substantially free from carbon dioxide and has a ratio of hydrogen to carbon monoxide of 0.65 on a molal basis. The yield of carbon monoxide and hydrogen is approximately 2600 pounds or 2485 pounds carbon monoxide and 115 pounds hydrogen.

Example II

When the generator temperature is increased to 3500° F., the quantity of steam supplied to the reduction zone is 900 pounds for the same quantity of coal. The product gas contains from about 7 to about 10 mol per cent carbon dioxide. A yield of approximately 3000 pounds of carbon monoxide and hydrogen is obtained with a molal ratio of hydrogen to carbon monoxide of 0.52. On a weight basis the yield of carbon monoxide is about 2890 pounds and the yield of hydrogen is 107 pounds.

Obviously many modifications and variations of the invention as above set forth may be made without departing from the spirit and scope thereof and only such limitations should be imposed as are indicated in the appended claims.

I claim:

1. In a process for the generation of carbon monoxide and hydrogen from a solid carbonaceous fuel by reaction with oxygen and steam, the improvement which comprises introducing said solid carbonaceous fuel in powdered form into the upper end of a vertical elongated cylindrical reaction zone, contacting said powdered fuel in said zone at the upper end adjacent the fuel inlet with a gas containing in excess of 90 per cent free oxygen by volume in an amount sufficient to oxidize only a portion of said powdered fuel thereby liberating heat and producing a gaseous reaction product containing carbon dioxide, passing the resulting hot gaseous reaction product and heated residual powdered fuel through said reaction zone to the lower end thereof, and introducing steam into said reaction zone at a plurality of spaced points on the periphery of said zone and along the path of said fuel at an angle upwardly toward the inlet end from 5 to 30° from the horizontal and inwardly from 5 to 30° from the tangent to impart a rotary motion to the reactants and products, and withdrawing the resulting product gases comprising carbon monoxide and hydrogen from said lower end of said reaction zone.

2. A process as defined in claim 1 wherein the pressure within said reaction zone is maintained in excess of about 100 pounds per square inch gauge.

3. The method as defined in claim 1 wherein said solid carbonaceous fuel is surface dried and contains moisture in its pore spaces.

4. A process as defined in claim 1 wherein the plurality of points at which the steam is introduced into the reaction zone are spirally spaced along the periphery of said reaction zone and the path of the stream of steam into the reaction zone at each of said points is directed into the path of a stream of steam introduced into the reaction zone at an adjacent point.

5. In a process for the generation of carbon monoxide and hydrogen from a solid carbonaceous fuel by reaction with oxygen and steam, the improvement which comprises introducing said solid carbonaceous fuel in powdered form into the upper end of a vertical elongated cylindrical reaction zone, contacting said powdered fuel in said zone at the upper end adjacent the fuel inlet with an oxygen-containing gas in an amount sufficient to oxidize only a portion of said powdered fuel thereby liberating heat and producing a gaseous reaction product containing carbon dioxide, passing the resulting hot gaseous reaction product and heated residual powdered fuel through said reaction zone to the lower end thereof, and introducing steam into said reaction zone at a plurality of spaced points on the periphery of said zone and along the path of said fuel tangentially and at an angle upwardly toward the inlet end to impart a rotary motion to the reactants and products, and withdrawing the resulting product gases comprising carbon monoxide and hydrogen from said lower end of said reaction zone.

LEON P. GAUCHER.

REFERENCES CITED

The following references are of record in the file of this patent:

UNITED STATES PATENTS

| Number | Name | Date |
|---|---|---|
| 1,039,398 | Hirt | Sept. 24, 1912 |
| 2,302,156 | Totzek | Nov. 17, 1942 |

FOREIGN PATENTS

| Number | Country | Date |
|---|---|---|
| 413,130 | Great Britain | Aug. 4, 1933 |

OTHER REFERENCES

Haslam and Russell: "Fuels and Their Combustion," McGraw-Hill Book Company, 1926, N. Y., page 434.